United States Patent [19]

Oka

[11] Patent Number: 4,506,804
[45] Date of Patent: Mar. 26, 1985

[54] VOLUME DETECTING DEVICE

[75] Inventor: Tateki Oka, Toyokawa, Japan

[73] Assignee: Minolta Camera Kabushiki Kaisha, Osaka, Japan

[21] Appl. No.: 456,723

[22] Filed: Jan. 10, 1983

[30] Foreign Application Priority Data

Feb. 8, 1982 [JP] Japan ................................. 57-19130

[51] Int. Cl.³ ............................................ B67D 5/08
[52] U.S. Cl. ..................................... 222/64; 340/617
[58] Field of Search ...................... 222/64, 65, 28, 27, 222/DIG. 1, 56, 55, 23; 340/614, 617; 73/290 R

[56] References Cited

U.S. PATENT DOCUMENTS

| 3,498,500 | 2/1968 | Hansen | 222/23 |
| 3,632,019 | 5/1970 | Harm | 222/64 |
| 4,054,230 | 10/1977 | Suzuki et al. | 222/DIG. 1 |
| 4,314,242 | 2/1982 | Kuru et al. | 340/617 |

FOREIGN PATENT DOCUMENTS 50-19459 2/1975 Japan .

Primary Examiner—Stanley H. Tollberg
Attorney, Agent, or Firm—Wenderoth, Lind & Ponack

[57] ABSTRACT

A volume detector for detecting the volume of powdery material in a container includes a roller having a fin and rotatably provided in the container for generating a periodic wavy motion of the powdery material so as to cause at least a portion of the powdery material to rise above and fall below a predetermined level. A level sensor is provided at the predetermined level in the container for producing high and low level signals, respectively, when at least a portion of the powdery material rises above and falls below the predetermined level. The signal produced from the level sensor is applied to a duty cycle detector for detecting the duty cycle of high level signal, thereby the duty cycle representing the volume of the powdery material.

20 Claims, 11 Drawing Figures

DEVELOPER VOLUME

VOLUME DETECTING DEVICE

BACKGROUND OF THE INVENTION

1. Field of the Invention

The present invention relates to an electrophotographic copying apparatus and, more particularly, to a device for detecting a volume of powdery developer contained in a container, such as in a casing or developing tank at a developing device, and a method therefor.

2. Description of the Prior Art

Electrostatic developing material commonly comprises a mixture of toner and carrier with a predetermined ratio. In order to obtain a fine developed image having a required density, it is necessary to maintain the concentration of toner in the developer mixture at a certain level. To this end, additional toner powder must be supplied to the developer mixture from time to time to replenish the consumed toner.

In the developing device that uses two-component powdered developer as mentioned above, the carrier will not be consumed during the development, but only the toner is consumed. Thus, during the development, the carrier hardly looses its volume. From this point of view, the concentration of toner in the developer mixture can be given from the total volume of developer mixture in the developing tank. More specifically, a relationship between the total volume M of the developer mixture in the developing tank and the concentration of toner can be give as follows:

$$Dt(\%) = Mt/(Mc+Mt) \times 100 = 100 \times (M-Mc)/M$$

wherein Dt is a concentration of toner, Mc is a volume of carrier, Mt is a volume of toner and M is a total volume ($M = Mc + Mt$). With the use of the above equation, it is possible to maintain the concentration of toner in the developer mixture constant by replenishing the consumed toner.

With the use of the above principle, various approaches have been made recently to control the supply of toner with reference to the volume of developer mixture in the developing tank. According to one prior art, the volume of developer mixture in the developing tank is measured by a level sensor which detects the level of top surface of developer mixture in the developing tank. The prior art method, however, fails to control the concentration of toner with high accuracy and is not capable of controlling the toner concentration effectively, because of the reasons set forth below.

(i) Generally, the level of the top surface of the developer mixture in power form is uneven, having an irregularity. Such an irregularity varies conspicuously depending on the fluidity of the developer mixture and also with respect to the change of environmental conditions, such as moisture, and, therefore, the contour of the top surface of the powdery developer mixture cannot be maintained uniform. Thus, the surface level of the developer mixture can not be detected with a high accuracy and, therefore, a precise detection of the volume of developer mixture can not be achieved.

(ii) There are cases in which it is required to change the toner concentration in the developer due to the sensitivity change of a photoreceptor or to the deterioration of developer. Although this requirement can be accomplished, according to the prior art, by changing the setting position of the level sensor, it is very difficult from a practical point of view to make such a change in the copying apparatus. Thus, it is difficult to change the toner concentration to a different required degree.

SUMMARY OF THE INVENTION

The present invention has been developed with a view to substantially solving the above described disadvantages and has for its essential object to provide an improved device and method for detecting the volume of powdery developer mixture with a high accuracy.

It is also an essential object of the present invention to provide an improved device and method of the above described type in which the toner concentration can be set to a required degree without difficulty.

In accomplishing these and other objects, a volume detector for detecting the volume of powdery material in a container, according to the present invention, comprises first means for generating a periodic wavy motion of the powdery material so as to cause at least a portion of the powdery material to rise above and fall below a predetermined level, a level sensor provided at the predetermined level in the container for producing first and second signals, respectively, when at least a portion of the powdery material rises above and falls below the predetermined level, and second means for detecting duty cycle of either first or second signal, thereby the duty cycle representing the volume of the powdery material.

BRIEF DESCRIPTION OF THE DRAWINGS

These and other objects and features of the present invention will become apparent from the following description taken in conjunction with a preferred embodiment thereof with reference to the accompanying drawings, throughout which like parts are designated by like reference numerals, and in which.

DESCRIPTION OF THE PREFERRED EMBODIMENTS

Before the description of the preferred embodiment of the present invention proceeds, the principle of volume detecting on which the present invention is based is described in connection with FIGS. 1 to 5.

Figure 1:
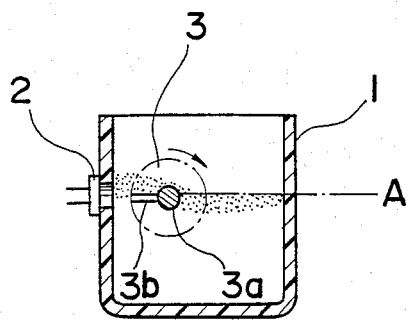
FIG. 1 is a diagrammatic view showing a principle of the present invention.
Figure 2:
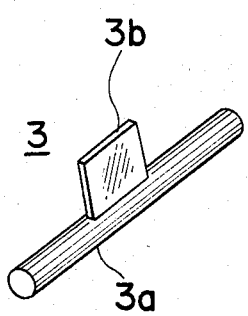
FIG. 2 is a perspective view of a stirring device employed in the device of FIG. 1.

Referring to FIG. 1, a container 1 for receiving developer mixture has a level detector 2 mounted in its side wall such that the center of the level detector 2 is located at a level A. A stirring device 3 defined by an axle 3a and a plate or rigid fin 3b, as best shown in FIG. 2, is provided adjacent to the level detector 2 such that as the axle 3a rotates in a direction shown by an arrow in FIG. 1, the fin 3b pushes up the developer mixture in front of the level detector 2. According to one example, the developer mixture contains magnetic material and the level detector 2 is a so-called magnetic level sensor which produces high and low level signals, respectively, with respect to presence and absence of magnetic material in front of its detecting face. More specifically, the level detector 2 produces a high level signal when at least its center is covered by the developer mixture.

Figure 3:
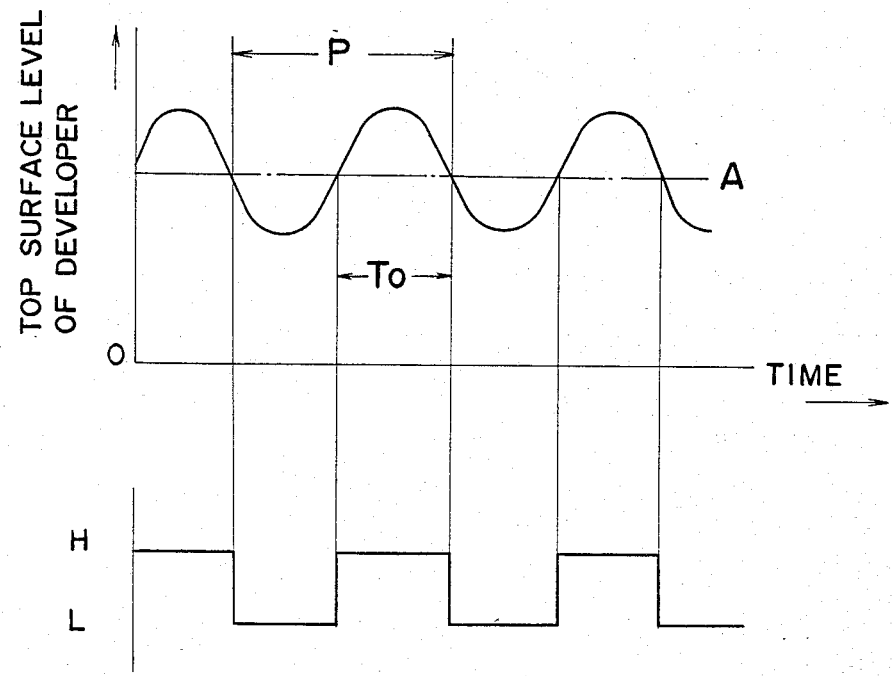
FIG. 3 is a graph showing the change of top surface level of the developer in a developing tank and an output signal produced from a level sensor.

When the developer mixture is filled up to the level A, and when the stirring device 3 rotates clockwise a1, as shown, the developer mixture in front of the level detector 2 alternately goes up and down with respect to the level A, and, accordingly, the top surface of the developer mixture in front of the level detector 2 changes in a form of a sinusoidal curve as shown in FIG. 3. In FIG. 3, a reference character P indicates a pitch for one complete up and down movement of the developer mixture, and such a pitch P corresponds to one rotation of the stirring device 3, while T0 indicates a time in which the top surface of the developer mixture rises above the level A. In the example shown in FIG. 3, the level A generally corresponds with a center line of the sinusoidal curve. When the top surface of the developer mixture in front of the level detector 2 rises above the level A, the level detector 2 produces a high level signal, and when it falls below the level A, the level detector 2 produces a low level signal. Thus, the level detector 2 alternately produces high and low level signals in rectangular waveform as shown in FIG. 3. From the foregoings, it is understood that when the developer mixture is filled up to the level A, the duty cycle of the signal produced from the level detector 2 is about $(T0/P) \times 100 = 50\%$.

Thus, by detecting the duty cycle of the signal produced from the level detector 2 (hereinafter referred to as a level signal), it is possible to detect the volume of developer mixture contained in the container 1. The relation between the duty cycle of the level signal and the volume of the developer mixture is further described in detail below with reference to FIGS. 4 and 5.

Figure 4:
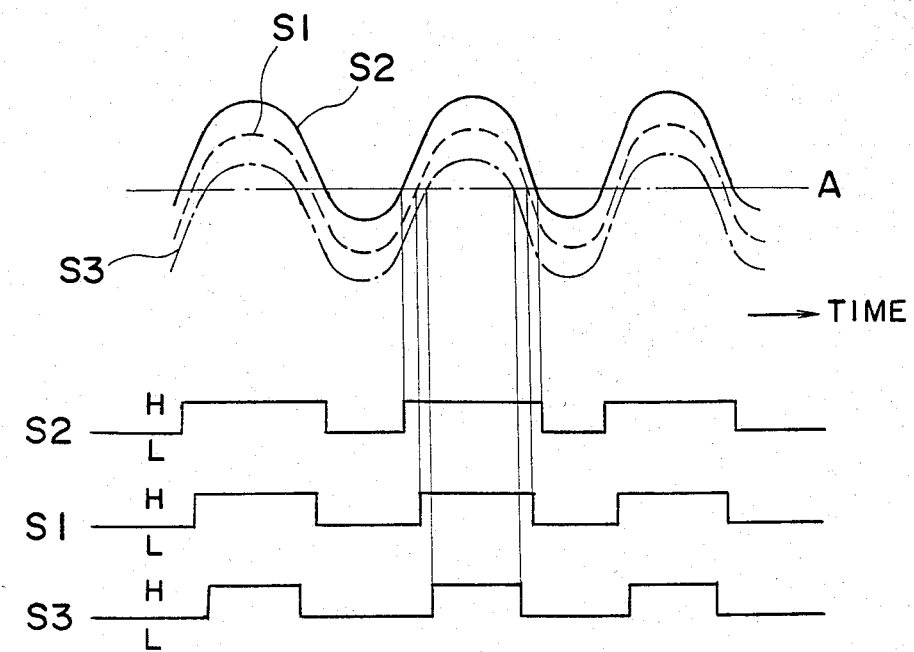
FIG. 4 is a graph similar to FIG. 3, but particularly showing change in waveform with respect to the change of volume of the developer.

Referring to FIG. 4, when the developer mixture is filled up to the level A, the change of top surface of the developer mixture in front of the level detector 2 will be as shown by the sinusoidal curve S1. In this case, the duty cycle is 50% as mentioned above. When the developer mixture is filled above the level A, the change of top surface of the developer mixture in front of the level detector 2 will be as shown by the sinusoidal curve S2 and, in this case, the duty cycle is more than 50%. And, when the developer mixture is filled below the level A, the change of top surface of the developer mixture in front of the level detector 2 will be as shown by the sinusiodal curve S3 and, in this case, the duty cycle is less than 50%.

Figure 5:
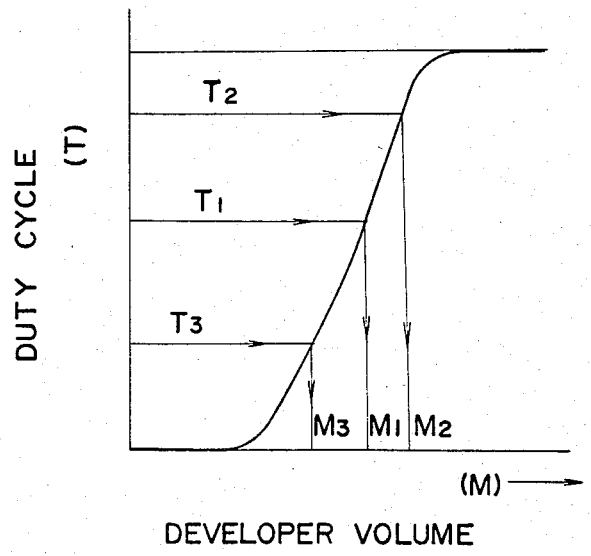
FIG. 5 is a graph showing a relationship between the volume of developer and the integrated time in which the level sensor detects the swelling of top surface in a unit time.

Therefore, as the volume of the developer mixture decreases, the duty cycle of the level signal decreases, or vice versa, and the relationship therebetween is shown in a graph of FIG. 5 in which abscissa and ordinate represent, respectively, volume of developer mixture and duty cycle.

Thus, when the detected duty cycle is T1, it is understood that the volume of the developer mixture is M1. When the detected duty cycle is T2, it is understood that the developer mixture volume is M2 which is greater than M1, and when the detected duty cycle is T3, it is understood that the developer mixture volume is M3 which is less than M1.

If it is required to control the developer mixture to volume M1, a duty cycle of the detected level signal is compared with a reference duty cycle which is set equal to T1. Then, when the detected duty cycle falls below the reference duty cycle, an additional toner is supplied to the developer mixture by an amount in relation to the difference between the detected and reference duty cycle, to maintain the developer mixture volume constant, thus maintaining the toner concentration constant.

By changing the reference duty cycle to other levels, it is possible to control the developer mixture to other volumes and, therefore, there is no need to change the position of the level detector to change the detection level.

According to a preferred embodiment, the duty cycle is detected by integrating the high level signal obtained from the level detector 2 for a unit time. In an alternative embodiment, it can be detected by integrating the low level signal from the detector 2 for a unit time. In this case, however, an additional toner must be supplied, when the detected duty cycle exceeds over the reference duty cycle.

In the principle described above, the rotation of stirring device 3 gives rise to a local up and down movement of the top surface of the developer mixture where such stirring device 3 is provided and, according to the preferred embodiment of the present invention, such an up and down movement should be carried out closely adjacent to the detecting face of the level detector 2 within the detecting range of the level detector. Preferably, the up and down movement should be carried out such that the loop, where the up and down movement is maximum, is located in a plane where the detecting surface is contained. In this case, the level detector 2 detects the up and down movement effectively, and yet, since developer mixture slidingly moves the detecting face, a bit of developer mixture which might adhere on the detecting face can be cleared away to prevent the detector 2 from producing false signals.

According to the present invention, the level detector 2, which has been described as defined by a magnetic level sensor that is sensitive to magnetic material, can be any other type, such as an optical level sensor that receives and senses the light rays reflected from the developer mixture, a supersonic sensor, a pressure sensor, or an electric sensor.

According to the present invention, since the volume of the developer mixture is measured by the detection of periodic up and down movement, no measuring error such as occurred when measuring the volume of developer mixture by the detection of irregular top surface as in the prior art, would occur.

Furthermore, as apparent from the principle described above, the level detector 2, according to the present invention, may be positioned at any desired level so long as its detecting face is located within the amplitude of up and down movement. Moreover, since the reference duty cycle can be set to any desired level, the developer mixture can be controlled to any desired volume. Therefore, during the manufacturing, there is no need to render the level A in flush with the top surface level of the developer mixture in optimum volume.

Figure 6:
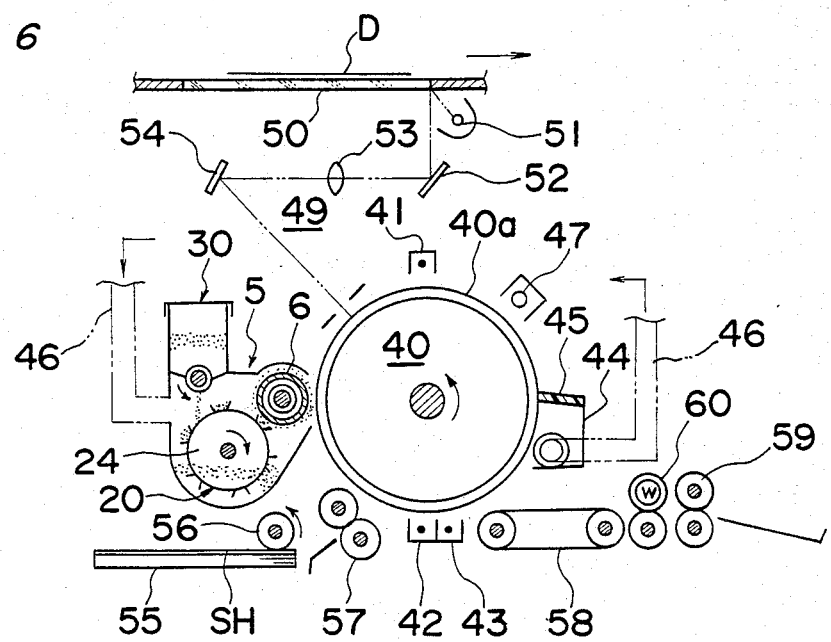
FIG. 6 is a schematic diagram showing a general construction of a toner image transfer type electrophotographic copying apparatus to which the device and method of the present invention may be applied.

Referring to FIG. 6, a toner image transfer type electrophotographic copying apparatus to which the level detecting device and control method according to the present invention may be applied.

In the copying apparatus of FIG. 6, at approximately the central portion thereof, a photosensitive or photoreceptor drum 40 having a photoconductive or photosensitive surface 40a provided therearound is rotatably disposed for rotation in the counterclockwise direction as indicated by an arrow, around which photoreceptor drum 40, there are sequentially disposed in a known manner, a corona charger 41 for uniformly charging the photosensitive surface 40a, an image exposure device 49 for projecting a light pattern of an original document D to be copied onto the photosensitive surface 40a so as to form an electrostatic latent image of the original document thereon, a developing device 5 for developing the latent image thus formed into a visible toner image by the developing material, a transfer corona charger 42 for electrostatically transferring the toner image onto a transfer material such as a copy paper sheet SH, a copy paper separating corona charger 43, a cleaning device 44 and an eraser lamp 47.

In the copying apparatus of FIG. 6 as described above, the image exposure device 49 is of a type in which a transparent platform 50 carrying thereon the original document D to be copied is adapted to reciprocate for scanning, and is so arranged that the lightwise image of the original document D illuminated by an exposure lamp 51 provided below and adjacent to the platform 50 is successively projected onto the photosensitive surface 40a of the drum 40 uniformly charged by the corona charger 41, through a mirror 52, optical system 53 and a mirror 54 so as to form the electrostatic latent image corresponding to the original document D on the photosensitive surface 40a for developing said latent image by the subsequent developing device 5.

On the other hand, the copy paper sheet SH fed by a copy paper feeding device 56 from a cassette provided at the lower left portion of FIG. 6, is transferred by a pair of transfer rollers 57, so that the toner image formed on the photosensitive surface 40a of the drum 40 is transferred to the sheet SH by the transfer charger 42 at the transfer position. Then, the sheet SH is separated from the surface 40a of the drum 40 by the separating charger 43. Thereafter, the sheet SH is further transported by a transport belt 58 out of the apparatus by an ejecting device 59 after the transferred image has been fixed thereto by a fixing device 60.

The cleaning device 44 disposed subsequent to the separating corona charger 43 is of a type which scrapes off the toner remaining on the photosensitive surface 40a after the transfer by keeping a blade 45 in a sliding contact with the photosensitive surface 40a of the drum 40. The toner thus scraped off is returned to the developing device 5 through a circulation pipe 46 for the repeated use in the subsequent copying operations.

Meanwhile, the residual potential on the photosensitive surface 40a is dissipated by the eraser lamp 47.

Figure 7:
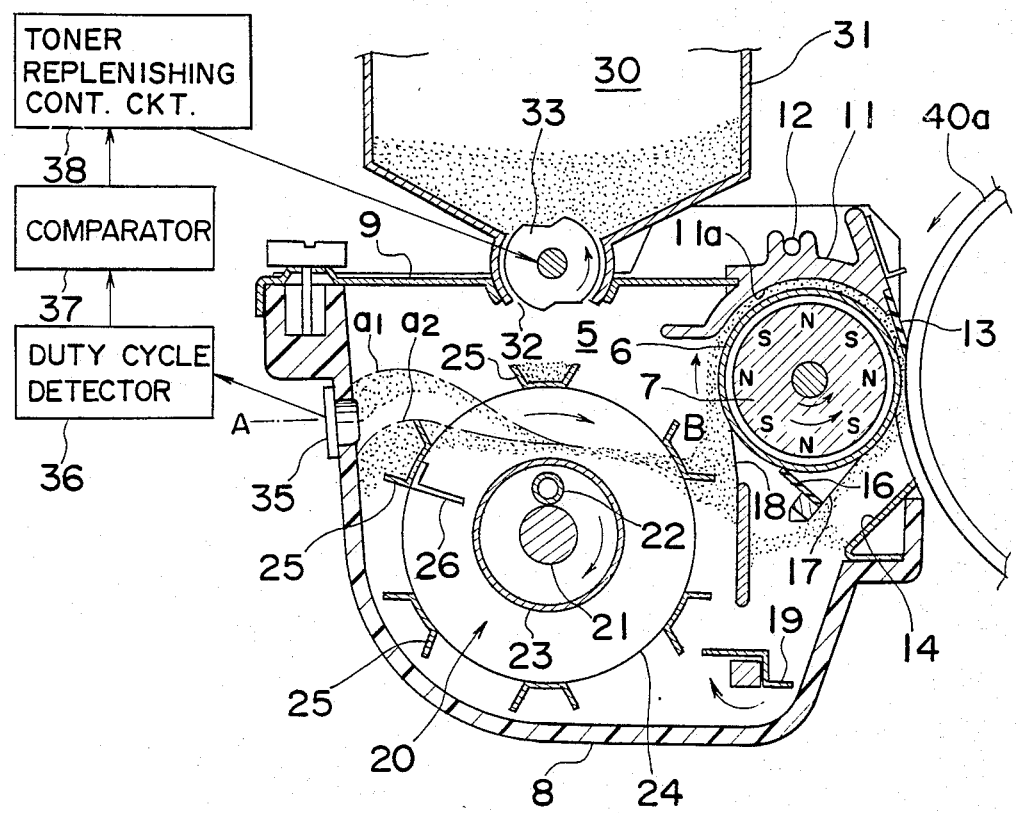
FIG. 7 is a cross-sectional view of a developing device employed in the copying apparatus of FIG. 6.

Referring now to FIG. 7, a detail of the above described developing device 5 of a so-called magnetic brush type is shown. The developing device 5 generally comprises a rotary developing sleeve or outer cylinder 6 functioning as a developing electrode, a magnetic member or magnet roll 7 rotatably enclosed in the developing sleeve 6, and a mixer 20 which are accommodated in a developing tank or casing 8. The developing sleeve 6 is made of a non-magnetic material, such as aluminum, and is arranged to be rotatable counterclockwise at 30.2 r.p.m. about its center with its outer surface passing closely adjacent the photosensitive surface 40a. The magnet roll 7 has a plurality of N and S poles arranged alternately around its outer surface, and is rotatably provided within the developing sleeve 6 for rotation in the counterclockwise direction at a high speed, such as 1300 r.p.m. The developer mixture transferred to a portion B by a bucket roller 24 receives counterclockwise rotational force by the rotation of the developing sleeve 6 and, at the same time, receives clockwise rotational force by the rotation of the magnet roll 7. As a result, the developer mixture moves clockwise along the outer surface of the developing sleeve 6 in a speed determined by the difference between both forces.

In the embodiment according to the present invention, the developer mixture comprises particles of magnetic carrier having resistivity of $10^{12}$–$10^{13}$Ω·cm and average particle diameter of 3–30 μm, and particles of toner having non-magnetic and high electric resistance properties and average particle diameter of 3–30 μm. The magnetic carrier and the toner are mixed at the weight rate of 10 to 1–2. It is to be noted that the toner is triboelectrically charged by contacting with the carrier in a polarity which is opposite to the polarity of electrostatic image formed on the photosensitive surface 40a.

The casing 8 serving as a developer mixture tank is sealed by a top plate 9 and a wall member 11. The wall member 11 is held in position by a pin 12 and also by the edge of top plate 9 and is formed with an arcuate surface 11a facing the developing sleeve 6 such that the magnetic brush extending from the developing sleeve 6 may contact the arcuate surface 11a. An elastic sealing member 13 is provided at the end of the wall member 11 remoted from the top plate 9, and extending in tangential direction with respect to the arcuate surface 11a so as to cause the sealing member 13 rub against the photosensitive surface 40a at its end.

Provided under the developing sleeve 6 are electrode plate 14 for electrically preventing the developer mixture from being spilt out, a sub-cleaner plate 16 provided such that its forward edge contacts the peripheral surface of the developing sleeve 6 under pressure in a direction following the direction of rotation of the developing sleeve 6, and a scraper plate 17 held in pressure contact with the peripheral surface of the developing sleeve 6 in a direction against the rotation of the sleeve 6. Furthermore, a cleaner plate 18 is provided such that its forward edge contacts the peripheral surface of the developing sleeve 6 under pressure in a direction following the direction of rotation of the developing sleeve 6, and a transfer blade 19 is provided for transferring the developer mixture towards the mixer 20 as it rotates clockwise about its axis.

By the above arrangement, the developer mixture is circulated in the following manner. By the clockwise rotation of a bucket roller 24, elongated buckets 25 provided on the periphery of the bucket roller 24 and each having U shape cross-section transfer the developer mixture towards a portion B where the developer mixture receives attractive force from the magnet roller 7. Since the magnet roller 7 is rotating counterclockwise at a high speed, the attracted developer mixture forms a so-called magnetic brush on the outer surface of the sleeve 6 and, at the same time, the magnetic brush shifts along the outer surface of the sleeve 6 in clockwise direction. While passing through a narrow space between the developing sleeve 6 and the photosensitive surface 40a, the magnetic brush develops the electrostatic latent image previously formed on the surface 40a into a visible image. The developer mixture after it is used in the development as described above is further transferred along the peripheral surface of the developing sleeve 6 in clockwise direction, and is subsequently removed from the peripheral surface of the developing sleeve 6 by the scraper plate 17 and, in turn, is transferred back into the casing 8 towards bucket roller 24 by the rotating blade 19. In the meantime, the surface of the sleeve 6 is cleaned by the cleaner plate 18 and also by the sub-cleaner plate 16.

During the development, since the magnetic brush slidingly contacts the arcuate surface 11a of the wall member 11, toner dust will not adhere on the arcuate surface 11a, and yet by the sealing member 13, no toner dust will leak out from the casing 8.

According to the embodiment described above, the developing sleeve 6 is kept driven all the time when the main switch (not shown) of the copying apparatus is tuned on, but the magnet roller 7 is driven only during the development is carried out. This is to prevent any developer mixture from being contacted on the photosensitive surface 40a in periods other than developing periods. Furthermore, in the embodiment described above, the developing sleeve 6 is biased with a voltage having the same polarity as the voltage of latent image on the photosensitive surface 40a.

The mixer 20 is defined by a cylinder 23 that extends in an axial direction of the casing 8 and the bucket roller 24. A coil spring 22 spirally wound on a rotating shaft 21 extends through the cylinder 23. The toner collected at the cleaning device 44 (FIG. 6) is transferred through the circulation pipe 46 to the cylinder 23 and is added to the previously provided developer mixture. Then, by the rotation of coil spring 22, the toner is mixed with the developer mixture and, such a mixture is sent out from the cylinder 23 into the casing 8 through a suitable opening (not shown) formed in the cylinder 23.

The bucket roller 24 is defined by a pair of circle end plates spaced a predetermined distance from each other and positioned in face-to-face relation with each other, and a plurality of buckets 25 extending between the end plates in a manner of cage. The buckets 25 are provided at equal intervals in the circumferential direction around the peripheral surface of the end plates. The bucket roller 24 is arranged to be driven for rotation in the clockwise direction at the speed 30 r.p.m. so as to dip up a magnetic developer mixture accommodated in the casing 8 by the buckets 25 for transportation thereof up to a developer mixture supply portion B which is adjacent to the developing sleeve 6.

An automatic toner dispensing device 30 is provided on the top plate 9 and generally includes a hopper or toner tank 31 having an opening at its lower portion for defining a path into the casing 8, and a toner replenishing roller 33 provided rotatably in counterclockwise direction at said lower opening of the toner tank 31. The roller 33 is axially formed with a plurality of toner replenishing grooves or recesses which are arranged to cause the toner particles accommodated in the toner tank 31 to fall into the casing 8 as the roller 33 rotates counterclockwise. The roller 33 is subjected to on/off control by a toner replenishing control circuit 38 in a manner according to the present invention as described below.

Figure 8:
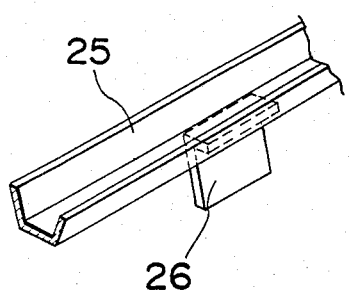
FIG. 8 is a fragmentary view of a bucket provided with a stirring plate in accordance with the present invention.

According to the preferred embodiment, a pressure sensor 35 is provided at the side wall of the casing 8 with its sensing face facing inside the casing 8 at a level A shown in FIG. 7. When the developer mixture is present at the level A touching the sensing face of the pressure sensor 35, the sensor 34 produces a high level signal. Contrary, when the developer mixture is absent at the sensing face, the sensor 35 produces a low level signal. A rigid stirring fin 26 is provided on a bottom surface of one bucket roller 25 so as to permit clockwise rotation of the fin 26 together with the bucket 25 at the speed 30 r.p.m. Preferably, the fin 26 is provided at an intermediate portion of the bucket 25, as shown in FIG. 8, such that during its rotation together with the bucket 25, the center of the fin 26 intercepts an axial line of the pressure sensor 35. When a bucket 25 provided with the fin 26 moves past a position near by the pressure sensor 35, the fin 26 pushes up the developer mixture causing swelling of top surface of the developer mixture around the sensor 35 up to a level indicated by a broken line $a_1$. At this moment, the sensor 35 is covered with the developer mixture and, therefore, it senses pressure and produces a high level signal. But, when a bucket 25 provided with no fin 26 moves past a position near by the pressure sensor 35, the bucket 25 pushes up the developer mixture only up to a level indicated by a broken line $a_2$. At this moment, the sensor 35 is maintained uncovered with the developer mixture and, therefore, it produces a low level signal. Since the fin 26 is provided on only one bucket 25, the pressure sensor 35 produces one high level signal in each rotation of the bucket roller 24. As understood from the principle described above, the duration of each high level signal (i.e., the duty cycle) differs relatively to the volume of developer mixture contained in the casing 8.

The signal produced from the pressure sensor 35 is applied to a detector 36 for detecting duty cycle of high level signal. The duty cycle detector 36 is connected to a comparator 37 in which the detected duty cycle is compared with a reference level. When the detected duty cycle falls below the reference level, the comparator 37 produces a signal to the toner replenishing control circuit 38 for effecting the supply of toner into the casing 8. Contrary, when the detected duty cycle is above the reference level, the toner replenishing control circuit 38 is maintained non-actuated to effect no supply of toner into the casing 8.

It is to be noted that the detector 36 can be changed to detect duty cycle of low level signal. In this case, however, the comparator 37 must produce the above signal, when the detected duty cycle exceeds over the reference level.

Figure 9:
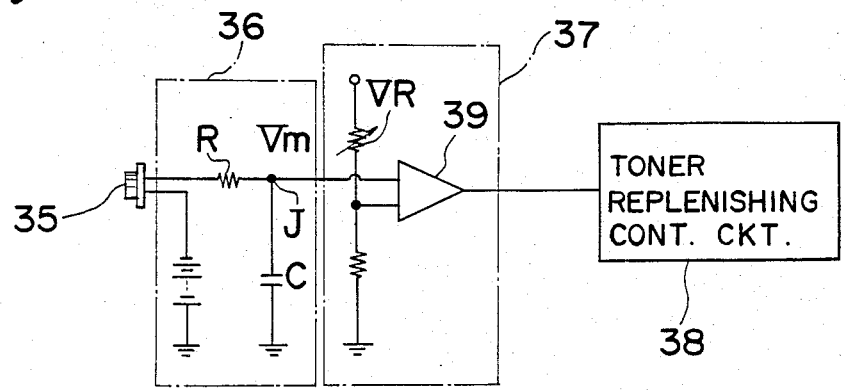
FIG. 9 is a diagram of an electric circuit connected to a level sensor.

Referring to FIG. 9, an example of duty cycle detector 36 and comparator 37 is shown. The duty cycle detector 36 shown is an integrator having a resistor R and a capacitor C connected in series to each other and between one terminal of the pressure sensor 35 and ground. The other terminal of the pressure sensor 35 is connected to a source of d.c. power. When the pressure sensor 35 produces a high level signal, a charging current flows through the resistor R to the capacitor C for charging the capacitor C, thus integrating the high level signal. The integrated signal in voltage Vm is produced from a junction J between the resistor R and capacitor C. During the pressure sensor 35 producing a low level signal, the capacitor C is discharged by a discharge current that flow through the resistor R to the pressure sensor 35. Thus, the charged voltage Vm in the capacitor C in each cycle of rotation of the bucket roller 24 corresponds to the duty cycle. The comparator 37 comprises an operational amplifier 39 having one input connected to said junction J between resistor R and the capacitor C for receiving the integrated voltage signal Vm, and the other input connected to a constant voltage source through a variable resistor VR for receiving a reference voltage. Preferably, said other input of the operational amplifier 39 is further connected to ground through a suitable resistor. The output of the operational amplifier 39 is connected to the toner replenishing control circuit 38. When the integrated voltage signal Vm falls below the reference voltage determined by the variable resistor VR, the operational amplifier 39 produces a high level signal which actuates the toner replenishing control circuit 38 to effect the supply of toner into the casing 8. But, when the integrated voltage signal Vm is above the reference voltage, the operational amplifier 39 produces a low level signal so as to maintain the toner replenishing control circuit 38 in non-actuated condition. In this manner, the volume of the developer mixture in the casing 8 can be maintained constant and, consequently, the toner concentration of the developer mixture is maintained constant.

Figure 10:
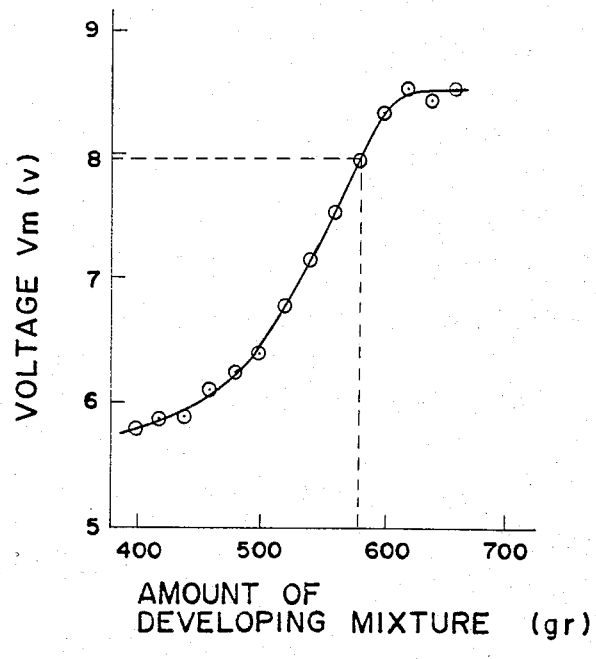
FIG. 10 is a graph showing a relationship between the volume of developer and the voltage produced from a comparator shown in FIG. 9.

According to the test carried out by the present inventor, the integrated voltage Vm showed a linear change, in a certain range, with respect to the change in amount of the developer mixture in the casing 8, as shown in graph of FIG. 10. Thus, by changing the reference level by the variable resistor VR, it is possible to change the aiming volume of the developer mixture to be controlled. Such a change in the reference level can be carried out by turning the variable resistor VR manually or automatically using a means for detecting environmental conditions that affect sensitivity of photosensitive surface 40a and/or physical characteristic of toner. According to one example, the aimed volume of the developer mixture is 580 grams (725 cm$^3$), and for this purpose, the reference voltage is set to 7.95 volts, as indicated in the graph of FIG. 10. In this case, when the detected integrated voltage Vm drops below 7.95 volts, the toner replenishing control circuit 38 is actuated to supply additional toner powder to the developer mixture to replenish the consumed toner, thus maintaining the developer mixture at 580 grams.

Figure 11:
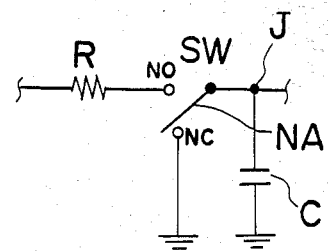
FIG. 11 is a fragmentary circuit diagram showing a modification of the circuit shown in FIG. 9.

Referring to FIG. 11, there is shown a modified duty cycle detector 36 of integrator type in which a switch SW is further connected between the resistor R and the junction J. The switch SW has a terminal NO connected to the resistor R and a terminal NC connected to ground. An arm NA connectable either to the terminal NO or NC is connected to the junction J. The switch SW is controlled by a suitable timer (not shown) for turning the switch SW such that the arm NA is connected to the terminal NO for a predetermined period of time for effecting only the current charge in the capacitor C and then, the arm NA is connected to the terminal NC for effecting the complete discharge of the capacitor C. In this manner, it is possible to integrate the charging current during the bucket roller 24 carries out a predetermined number of rotations and, thereby obtaining the average duty cycle in said predetermined period of time. In this case, a suitable diode is connected in series to the resistor R to prevent the discharging current from flowing through the sensor 35, or a sensor 35 itself should have a diode function to prevent current flow of such a discharging current.

According to the present invention, since the top surface of the developer mixture is periodically raised up by the fin 26 provided in association with the bucket roller 24, the contour of the top surface of the powdery developer mixture, particularly the swelling portion when raised up differs relatively to the volume of the developer mixture and yet, such a swelled top surface shows the same contour for the same volume of the developer mixture. Thus, the sensor 35 produces a level signal for a period when the swelled portion rises above a predetermine level A, and such a level signal corresponds to the volume of the developer mixture in high accuracy. Thus, by obtaining the duty cycle of the level signal, the volume of the developer mixture can be obtained instantaneously in high accuracy. And, by using the obtained duty cycle, it is possible to control the developer mixture volume constant, thus maintaining the toner concentration constant.

Furthermore, since the level signal is detected during the swelling, no erroneous detection caused by the irregularity of the top surface of the developer mixture will occur.

Furthermore, since the volume of the developer mixture is detected by the duty cycle of the level signal, there is no need to change the position of the sensor when it is required to change the aiming volume of the developer mixture to be controlled. Thus, the aiming toner concentration can be changed to without difficulty.

It is to be noted that the volume detecting device and its method according to the present invention can be applied not only to the copying apparatus on which the preferred embodiment has been described but any other devices which uses powdery material.

Although the present invention has been fully described with reference to a preferred embodiment, many modifications and variations thereof will now be apparent to those skilled in the art, and the scope of the present invention is therefore to be limited not by the details of the preferred embodiment described above, but only by the terms of appended claims.

What is claimed is:

1. A volume detector for detecting the volume of a powdery material in a container, which comprises:
   a first means for generating a periodic wavy motion of said powdery material so as to cause at least a portion of said powdery material to rise above and fall below a predetermined level;
   a level sensor disposed adjacent said powdery material undergoing said wavy motion for generating first and second signals, respectively, when at least a portion of said powdery material rises above and falls below said predetermined level; and
   a second means for measuring the time period during which either of said first and second signals are generated within a predetermined time period during the operation of said first means so as to detect the volume of said powdery material on the basis of said measured time period.

2. A volume detector as claimed in claim 1, wherein said second means comprises an integrator for integrating said either of said first and second signals for a predetermined period of time.

3. A volume detector as claimed in claim 1, further comprising a third means for generating a reference time period and comparing means for comparing said measured time period of said second means with said reference time period, wherein said comparing means produces a third signal when said measured time period overlaps said reference time period.

4. A volume detector as claimed in claim 3, wherein said third means comprises a variable means for changing said reference time period.

5. A volume detector as claimed in claim 1, wherein said level sensor is a pressure sensor.

6. A volume detector as claimed in claim 1, wherein said powdery material contains magnetic material, and wherein said level sensor is a magnetic sensor.

7. In a developing device having a developing tank containing a two-component type powdery developer mixture of toner and carrier particles, a toner dispensing device for dispensing toner powder into said developing tank to replenish the consumed toner, and a controller for detecting the concentration of said toner in said developer mixture in said developing tank so as to control the operation of a dispensing device on the basis of said detected concentration, said controller comprising:
a first means for generating a periodic wavy motion of said developer mixture so as to cause at least a portion of said developer mixture to rise above and fall below a predetermined level;
a level sensor disposed adjacent said powdery material undergoing said wavy motion for generating first and second signals, respectively, when at least a portion of said developer mixture rises above and falls below said predetermined level;
a second means for measuring the time period during which said first signal is generated within a predetermined time period during the operation of said first means;
a third means for generating a reference time period;
a comparing means for comparing said measured time period from said second means with said reference time period, and for producing a third signal when said measured time period is shorter than said reference time period, said third signal being applied to said toner dispensing device for effecting the dispensing of toner powder into said developing tank so as to maintain the concentration of toner in said developer mixture constant.

8. A volume detector as claimed in claim 7, wherein said first means comprises a rotatable roller provided in said developing tank so as to rotate at a constant speed such that a circumferential face of said roller move past different levels in said developing tank, and having at least one fin mounted on said roller.

9. A volume detector as claimed in claim 7, wherein said third means comprises a variable means for changing said reference time period.

10. A volume detector as claimed in claim 7, wherein said periodic wavy motion generated by said first means is a sinusoidal wave motion.

11. In a developing device having a developing tank containing a two-component type powdery developer mixture of toner and carrier particles, a toner dispensing device for dispensing toner powder into said developing tank to replenish the consumed toner, and a controller for detecting the concentration of said toner in said developer mixture in said developing tank so as to control the operation of a dispensing device on the basis of said detected concentration, said controller comprising:
a first means for generating a periodic wavy motion of said developer mixture so as to cause at least a portion of said developer mixture to rise above and fall below a predetermined level;
a level sensor disposed adjacent said powdery material undergoing said wavy motion for generating first and second signals, respectively, when at least a portion of said developer mixture rises above and falls below said predetermined level;
a second means for measuring the time period during which said second signal is generated within a predetermined time period during the operation of said first means;
a third means for generating a reference time period; and
comparing means for comparing said measured time period from said second means with said reference time period, and for producing a third signal when said measured time period is longer than said reference time period, said third signal being applied to said toner dispensing device for effecting the dispensing of toner powder into said developing tank so as to maintain the concentration of toner in said developer mixture constant.

12. A method for detecting the volume of powdery material in a container comprising the steps of:
generating a periodic wavy motion of the powdery material so as to cause at least a portion of said powdery material to rise above and fall below a predetermined level;
sensing the presence and absence of waving powdery material at said predetermined level; and
measuring the time period of either presence or absence of the sensed powdery material, wherein the measured time period is representative of the volume of said powdery material.

13. A volume detector as claimed in claim 11, wherein said first means comprises a rotatable roller provided in said developing tank so as to rotate at a constant speed such that a circumferential face of said roller moves past different levels in said developing tank, and having at least one fin mounted on said roller.

14. A volume detector as claimed in claim 11, wherein said third means comprises a variable means for changing said reference time period.

15. A volume detector as claimed in claim 11, wherein said periodic wavy motion generated by said first means is a sinusoidal wave motion.

16. A method as claimed in claim 12, wherein the step of measuring the time period of either the presence or absence of the sensed powdery material comprises integrating the time period during the sensed presence or absence of wavy powdery material at said predetermined level for a predetermined period of time.

17. A method as claimed in claim 12, further comprising the step of generating a reference time period and comparing the period of time during which the presence or absence of the wavy powdery material is at said predetermined level with the reference time period, wherein a signal is generated when the time period when the presence or absence of the wavy powdery material at said predetermined level is sensed overlaps the reference time period.

18. A method as claimed in claim 17, wherein the reference time period is variable.

19. A method as claimed in claim 12, wherein the step of sensing the presence and absence of wavy powdery material at said predetermined level comprises sensing the pressure at said predetermined level.

20. A method as claimed in claim 12, wherein said powdery material contains magnetic material and wherein the step of sensing the presence and absence of wavy material level at said predetermined level comprises magnetically sensing the presence and absence of wavy powdery material.

* * * * *